United States Patent
Hsiao et al.

(10) Patent No.: US 12,109,497 B2
(45) Date of Patent: Oct. 8, 2024

(54) METHODS, SYSTEMS, AND MEDIA FOR COORDINATING MULTIPLAYER GAME SESSIONS

(71) Applicant: Google LLC, Mountain View, CA (US)

(72) Inventors: Catherine Hsiao, San Francisco, CA (US); Alan Merzon, San Jose, CA (US); Kristie Fisher, Venice, CA (US); Stacey Peterson, Los Gatos, CA (US); Haochen Liu, San Jose, CA (US); Nicholas Dunn, Mountain View, CA (US); Tahasildar Ramachandra Shivputrappa, Mountain View, CA (US); Sam Cheung, San Francisco, CA (US); Erica Hansen, Los Altos, CA (US); Benjamin Frenkel, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 17/942,742

(22) Filed: Sep. 12, 2022

(65) Prior Publication Data

US 2023/0001308 A1    Jan. 5, 2023

Related U.S. Application Data

(63) Continuation of application No. 16/976,620, filed as application No. PCT/US2018/037732 on Jun. 15, 2018, now Pat. No. 11,439,913.

(51) Int. Cl.
*A63F 13/795*    (2014.01)
*A63F 13/355*    (2014.01)
(Continued)

(52) U.S. Cl.
CPC .......... *A63F 13/795* (2014.09); *A63F 13/355* (2014.09); *A63F 13/48* (2014.09); *A63F 13/86* (2014.09)

(58) Field of Classification Search
CPC ...... A63F 13/795; A63F 13/355; A63F 13/48; A63F 13/86
See application file for complete search history.

(56) References Cited

U.S. PATENT DOCUMENTS

| | | |
|---|---|---|
| 7,311,608 B1 | 12/2007 | Danieli et al. |
| 9,100,629 B1 * | 8/2015 | Brenden .................. G06F 3/14 |

(Continued)

FOREIGN PATENT DOCUMENTS

| | | |
|---|---|---|
| CN | 101001678 | 7/2007 |
| CN | 101361092 | 2/2009 |

(Continued)

OTHER PUBLICATIONS

Office Action dated Aug. 8, 2023 in CN Patent Application No. 201880090756.6.

(Continued)

*Primary Examiner* — Reginald A Renwick
(74) *Attorney, Agent, or Firm* — Shumaker & Sieffert, P.A.

(57) ABSTRACT

Methods, systems, and media for coordinating multiplayer game sessions are provided. In some embodiments, the method comprises: determining that a first user associated with a first user device is viewing game content created by a second user associated with a second user device; in response to determining that the first user is viewing the game content created by the second user, determining whether the first user satisfies criteria for joining a multiplayer game session with the second user; in response to determining that the first user satisfies criteria for joining the (Continued)

multiplayer game session with the second user, causing a selectable input element to join a queue of players to participate in the multiplayer game session with the second user to be presented on the first user device; in response to determining that the selectable input element to join the queue of players has been selected on the first user device, adding the first user to a position of the queue of players; in response to determining that the first user can participate in the multiplayer games session based on the position within the queue of players, causing an invitation to join the multiplayer game session to be presented on the first user device; in response to determining that the invitation to join the multiplayer game session has been accepted on the first user device, causing the first user to be added to the multiplayer game session; causing the multiplayer game session to begin on the first user device, wherein the multiplayer game session includes at least the first user and the second user; and in response to determining that the multiplayer game session has ended, removing the first user from the multiplayer game session.

20 Claims, 5 Drawing Sheets

(51) Int. Cl.
*A63F 13/48* (2014.01)
*A63F 13/86* (2014.01)

(56) References Cited

U.S. PATENT DOCUMENTS

| | | | |
|---|---|---|---|
| 11,439,913 B2 | 9/2022 | Hsiao et al. | |
| 2007/0173325 A1* | 7/2007 | Shaw | A63F 13/795 463/42 |
| 2010/0056280 A1 | 3/2010 | Langan et al. | |
| 2010/0222147 A1 | 9/2010 | Langan et al. | |
| 2012/0040752 A1 | 2/2012 | Koo | |
| 2014/0179428 A1 | 6/2014 | Miura et al. | |
| 2015/0043892 A1 | 2/2015 | Groman | |
| 2015/0273326 A1 | 10/2015 | Heppe et al. | |
| 2015/0363817 A1 | 12/2015 | Viharo | |
| 2017/0001111 A1 | 1/2017 | Willette et al. | |
| 2017/0182423 A1 | 6/2017 | Leppinen et al. | |
| 2017/0259178 A1 | 9/2017 | Aghdaie et al. | |
| 2017/0354880 A1 | 12/2017 | Miura et al. | |
| 2017/0368454 A1 | 12/2017 | Sivak et al. | |
| 2018/0111047 A1 | 4/2018 | Heppe et al. | |
| 2018/0169528 A1* | 6/2018 | Hinoshita | A63F 13/795 |
| 2020/0016495 A1 | 1/2020 | Cruz et al. | |

FOREIGN PATENT DOCUMENTS

| | | |
|---|---|---|
| CN | 101616719 | 12/2009 |
| CN | 101835516 | 9/2010 |
| CN | 102214266 | 10/2011 |
| CN | 104606892 | 5/2015 |

OTHER PUBLICATIONS

Notice of Intent to Grant from counterpart Chinese Application No. 201880090756.6 dated Jan. 4, 2024, 7 pp.
Notice of Intent to Grant from counterpart Korean Application No. 10-2022-7046230 dated Feb. 27, 2024, 5 pp.
Office Action dated Apr. 6, 2023 in KR Patent Application No. 10-2022-7046230.
Examination Report dated Jan. 19, 2022 in IN Patent Application No. 202047038493.
Examination Report dated Jan. 24, 2022 in EP Patent Application No. 18740378.7.
FussBot, "The Most Feature-Rich Chat Bot for YouTube Gaming", last updated Mar. 17, 2017, pp. 1-5 available at: https://web.archive.org/web/20180224094406/https://fussbot.io/.
International Search Report and Written Opinion dated Dec. 10, 2018 in International Patent Application No. PCT/US2018/037732.
Notice of Allowance dated May 3, 2022 in U.S. Appl. No. 16/976,620.
Office Action dated Mar. 8, 2022 in KR Patent Application No. 10-2020-7026328.
Pixels Gaming, "'Game Queue' Twitch Extensionis Live!", last updated Nov. 24, 2017, pp. 1-6, available at: https://medium.com/pixels-gaming/game-queue-twitch-extension-is-live-87d4ab255b8d.
Communication pursuant to Rules 161(1) and 162 EPC from counterpart European Application No. 18740378.7 dated Sep. 20, 2023, 3 pp.
International Preliminary Report on Patentability from International Application No. PCT/US2018/037732 dated Dec. 15, 2020, 8 pp.
Office Action, and translation thereof, from counterpart Korean Application No. 10-2022-7046230 dated Oct. 30, 2023, 6 pp.
Prosecution History from U.S. Appl. No. 16/976,620, now issued U.S. Pat. No. 11,439,913, dated May 3, 2022 through May 16, 2022, 9 pp.
Response to Communication pursuant to Article 94(3) EPC dated Jan. 24, 2022, from counterpart European Application No. 18740378.7 filed Jul. 19, 2022, 5 pp.
Response to Communication Pursuant to Rules 161(1) and 162 EPC dated Sep. 23, 2020, from counterpart European Application No. 18740378.7, filed Oct. 20, 2020, 14 pp.
Response to First Examination Report dated Jan. 19, 2022, from counterpart Indian Application No. 202047038493 filed Jul. 18, 2022, 6 pp.
Notice of Intent to Grant and Text Intended to Grant from counterpart European Application No. 18740378.7 dated Mar. 28, 2024, 9 pp.

* cited by examiner

METHODS, SYSTEMS, AND MEDIA FOR COORDINATING MULTIPLAYER GAME SESSIONS

CROSS-REFERENCE TO RELATED APPLICATIONS

This application is a continuation of U.S. patent application Ser. No. 16/976,620, filed Aug. 28, 2020, which is the national stage application under 35 U.S.C. § 371 of PCT/US2018/037732, filed Jun. 15, 2018, each of which is incorporated by reference herein in its entirety.

TECHNICAL FIELD

The disclosed subject matter relates to methods, systems, and media for coordinating multiplayer game sessions.

BACKGROUND

People frequently enjoy playing games, such as video games, with others. For example, a video game player known in a community of game players may live stream videos of himself or herself playing video games, and may want to invite other users to join in a game session. However, it can be difficult for a game player to invite others to join a game session. For example, in some cases, a game player may announce that they will be online at a particular time for other users to join in a game session. In another example, a game player may obtain a username (or gamertag) associated with a player, add the player on a messaging or social networking system (e.g., as a friend), and use the messaging or social networking system to communicate with the player to set up a future game session. It is generally difficult to organize these game sessions.

Accordingly, it is desirable to provide new methods, systems, and media for coordinating multiplayer game sessions.

SUMMARY

Methods, systems, and media for coordinating multiplayer game sessions are provided.

In accordance with some embodiments of the disclosed subject matter, a method for coordinating multiplayer game sessions is provided, the method comprising: determining that a first user associated with a first user device is viewing game content created by a second user associated with a second user device; in response to determining that the first user is viewing the game content created by the second user, determining whether the first user satisfies criteria for joining a multiplayer game session with the second user; in response to determining that the first user satisfies criteria for joining the multiplayer game session with the second user, causing a selectable input element to join a queue of players to participate in the multiplayer game session with the second user to be presented on the first user device; in response to determining that the selectable input element to join the queue of players has been selected on the first user device, adding the first user to a position of the queue of players; in response to determining that the first user can participate in the multiplayer games session based on the position within the queue of players, causing an invitation to join the multiplayer game session to be presented on the first user device; in response to determining that the invitation to join the multiplayer game session has been accepted on the first user device, causing the first user to be added to the multiplayer game session; causing the multiplayer game session to begin on the first user device, wherein the multiplayer game session includes at least the first user and the second user; and, in response to determining that the multiplayer game session has ended, removing the first user from the multiplayer game session.

In some embodiments, determining that the invitation to join the multiplayer game session has been selected on the first user device further comprises: determining whether the invitation has been accepted within a predetermined time range; and, in response to determining that the invitation has not been accepted within the predetermined time range, returning the first user to a position within the queue of players to participate in an upcoming multiplayer game session.

In some embodiments, the method further comprises removing the first user from the queue of players in response to determining that the first user has been moved to an end position within the queue of players more than a predetermined number of times.

In some embodiments, the criteria to join the multiplayer game session with the second user includes an indication that the first user has subscribed to the second user.

In some embodiments, the criteria to join the multiplayer game session with the second user includes an indication that the first user has purchased a game associated with the multiplayer game session and the method further comprises presenting an option to purchase the game associated with the multiplayer game session in response to determining that the first user has not purchased the game associated with the multiplayer game session.

In some embodiments, determining that the first user associated with the first user device is viewing the game content created by the second user associated with the second user device further comprising determining that the first user associated with the first user device has accessed a page that presents video channels associated with the second user, wherein one of the video channels on the page is streaming gameplay of the second user in a video window, wherein the selectable input element is presented within the video window, and wherein the multiplayer game session that includes at least the first user and the second user is presented in the video window.

In some embodiments, the method further comprises: in response to determining that the first user associated with the first user device has accessed the page in which the video window is streaming gameplay of the second user, determining player eligibility information associated with the first user and determining queue state information associated with the queue of players; comparing the player eligibility information (e.g., user information, game entitlement information, etc.) and the queue state information (e.g., joined a queue, invited to a multiplayer game session, accepted an invitation to a multiplayer game session, playing in a multiplayer game session, etc.) associated with the first user with the criteria for joining the multiplayer game session with the second user; and causing the selectable input element to join the queue of players to participate in the multiplayer game session with the second user to be presented based on the comparison.

In some embodiments, the criteria to join the multiplayer game session includes an indication that the first user has associated a video account associated with a video service that presents the page of video channels with a gaming account associated with the game corresponding to the multiplayer game session.

In some embodiments, the method further comprises: receiving a request from the second user associated with the second user device to activate the multiplayer game session in which the second user is participating, wherein the game content corresponding to the multiplayer game session is streamed to a page; and receiving the criteria for joining the multiplayer game session from the second user associated with the second user device, wherein the selectable input element is presented to the first user in response to satisfying the criteria.

In some embodiments, the method further comprising, in response to receiving the request from the second user associated with the second user device to enable the multiplayer game session in which the second user is participating, determining whether the second user has associated a video account associated with a video service that presents the page of video channels with a gaming account associated with the game corresponding to the multiplayer game session.

In some embodiments, the method further comprises: receiving a request from the second user to present image content from a camera device connected to the second user device; and generating a content stream that includes the game content from the multiplayer game session and the image content from the camera device connected to the second user device.

In some embodiments, the method further comprises transmitting the content stream to the first user device and the second user device.

In some embodiments, the method further comprises: determining that the first user is inhibited from participating in the multiplayer game session with the second user; and inhibiting the selectable input element from being presented on the first user device.

In some embodiments, the first user is inhibited from participating in the multiplayer game session in response to receiving an indication from the second user of the second user device.

In some embodiments, the method further comprises causing an interface that includes the queue of players to be presented to the second user of the second user device, wherein the interface provides selectable options that allow the second user to modify the queue of players.

In some embodiments, the method further comprises: generating a video content item from the game content of the multiplayer game session that included at least the first user and the second user; and causing the video content item to be presented on a page associated with that presents video channels associated with the second user, wherein one of the video channels on the page is streaming gameplay of the second user in a video window, wherein the selectable input element is presented within the video window.

In some embodiments, the method further comprises receiving a request from the second user to initiate a subsequent game session that includes at least the first user and the second user.

In accordance with some embodiments of the disclosed subject matter, a system for coordinating multiplayer game sessions is provided, the system comprising a memory and a hardware processor that, when executing computer executable instructions stored in the memory, is configured to: determine that a first user associated with a first user device is viewing game content created by a second user associated with a second user device; in response to determining that the first user is viewing the game content created by the second user, determine whether the first user satisfies criteria for joining a multiplayer game session with the second user; in response to determining that the first user satisfies criteria for joining the multiplayer game session with the second user, cause a selectable input element to join a queue of players to participate in the multiplayer game session with the second user to be presented on the first user device; in response to determining that the selectable input element to join the queue of players has been selected on the first user device, add the first user to a position of the queue of players; in response to determining that the first user can participate in the multiplayer games session based on the position within the queue of players, cause an invitation to join the multiplayer game session to be presented on the first user device; in response to determining that the invitation to join the multiplayer game session has been accepted on the first user device, cause the first user to be added to the multiplayer game session; cause the multiplayer game session to begin on the first user device, wherein the multiplayer game session includes at least the first user and the second user; and, in response to determining that the multiplayer game session has ended, remove the first user from the multiplayer game session.

In accordance with some embodiments of the disclosed subject matter, a non-transitory computer-readable medium containing computer executable instructions that, when executed by a processor, cause the processor to perform a method for coordinating multiplayer game sessions is provided, the method comprising: determining that a first user associated with a first user device is viewing game content created by a second user associated with a second user device; in response to determining that the first user is viewing the game content created by the second user, determining whether the first user satisfies criteria for joining a multiplayer game session with the second user; in response to determining that the first user satisfies criteria for joining the multiplayer game session with the second user, causing a selectable input element to join a queue of players to participate in the multiplayer game session with the second user to be presented on the first user device; in response to determining that the selectable input element to join the queue of players has been selected on the first user device, adding the first user to a position of the queue of players; in response to determining that the first user can participate in the multiplayer games session based on the position within the queue of players, causing an invitation to join the multiplayer game session to be presented on the first user device; in response to determining that the invitation to join the multiplayer game session has been accepted on the first user device, causing the first user to be added to the multiplayer game session; causing the multiplayer game session to begin on the first user device, wherein the multiplayer game session includes at least the first user and the second user; and, in response to determining that the multiplayer game session has ended, removing the first user from the multiplayer game session.

In accordance with some embodiments of the disclosed subject matter, a system for coordinating multiplayer game sessions is provided, the system comprising: means for determining that a first user associated with a first user device is viewing game content created by a second user associated with a second user device; means for determining whether the first user satisfies criteria for joining a multiplayer game session with the second user in response to determining that the first user is viewing the game content created by the second user; means for causing a selectable input element to join a queue of players to participate in the multiplayer game session with the second user to be presented on the first user device in response to determining that the first user satisfies criteria for joining the multiplayer game session with the second user; means for adding the first user to a position of the queue of players in response to determining that the selectable input element to join the queue of players has been selected on the first user device; means for causing an invitation to join the multiplayer game session to be presented on the first user device in response to determining that the first user can participate in the multiplayer games session based on the position within the queue of players; means for causing the first user to be added to the multiplayer game session in response to determining that the invitation to join the multiplayer game session has been accepted on the first user device; means for causing the multiplayer game session to begin on the first user device, wherein the multiplayer game session includes at least the first user and the second user; and means for removing the first user from the multiplayer game session in response to determining that the multiplayer game session has ended.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for coordinating multiplayer game sessions are provided.

In some embodiments, the mechanisms described herein can coordinate multiplayer game sessions. For example, in some embodiments, the mechanisms can determine that a first user is viewing content associated with a game being played or otherwise created by a second user (sometimes referred to herein as a "creator" or "content creator"), and can cause a selectable input element to be presented on a user device associated with the first user, where, upon selection, the selectable input element allows the first user to join a queue of players waiting to join a multiplayer game session with the second user. In some embodiments, the content associated with a game can include any suitable type of content, such as live-streamed content of the second user playing a game, pre-recorded video content of the second user playing a game, and/or any other suitable type of content. In some embodiments, the first user can select the selectable input element (e.g., from within a user interface in which the content is being viewed, and/or in any other suitable manner), and, in response to the selection, the first user can be added to a queue to join a multiplayer game session with the second user.

In a more particular example, the mechanisms described herein can present a watch page or any other suitable page of video content associated with a video account associated with the second user. The second user can associate the video account with a gaming account associated with a gaming service and activate an option to allow users to participate in multiplayer game sessions with the second user. In continuing the above example, the mechanisms can present live-streamed video content of each multiplayer game session in a video window on the page associated with the video account of the second user and the selectable input element that allows users to be placed in a queue of players for joining a multiplayer game session can be presented within the video window.

In some embodiments, the mechanisms described herein can determine whether to present the selectable input element to the first user based on any suitable criteria. For example, the mechanisms can determine whether the first user is eligible to join a multiplayer game session with the second user based on any suitable criteria. For example, in some embodiments, the criteria can include an indication that the first user has previously subscribed to and/or sponsored a channel of content associated with the second user (e.g., a channel of content corresponding to video content associated with game content played by the second user, and/or any other suitable channel of content). In another example, in some embodiments, the criteria can include an indication that the first user has previously provided monetary support or recurring monetary support for the second user in a gaming service. In yet another example, in some embodiments, the criteria can include an indication that the first user has previously sponsored game content associated with the second user in a gaming service (e.g., a particular gaming session being played and presented by the second user). In yet another example, in some embodiments, the criteria can include whether the first user has user entitlements to play a particular game associated with the multiplayer game session (e.g., based on whether the first user has previously purchased and/or rented the game being played in the multiplayer game session, based on whether the first user is older than a particular age, based on whether the first user is within a particular location, based on whether the first user is using a particular web browsing application, and/or any other suitable allowability criteria). In some embodiments, the mechanisms can cause the selectable input element to join a multiplayer game session with the second user to be presented on a user device associated with the first user in response to determining that the first user has met one or more of the suitable criteria to join the multiplayer game session. Alternatively, in some embodiments, the selectable input element may be presented in the video window on the page associated with the video account of the second user and may be de-activated in response to determining that the first user does not meet the criteria.

In some embodiments, based on queue state information, the mechanisms can transmit an invitation to the first user using a first user device, where the invitation causes the first user of the first user device to join a multiplayer game session with the second user. In response to determining that the invitation has not been accepted by the first user of the first user device within a particular time window, the mechanisms can return the first user to the queue of players. In some embodiments, in response to determining that the invitation has not been accepted by the first user of the first user device a particular number of times, the mechanisms can remove the first user from the queue of players. In some embodiments, in response to determining that the invitation has not been accepted by the first user of the first user device a particular number of times, the mechanisms can inhibit the selectable input element from being activated (e.g., for a particular content creator, for a particular duration of time, for a particular numbers of sessions, etc.).

In some embodiments, the mechanisms described herein can then add users from a queue of players to join a multiplayer game session with the second user. For example, in some embodiments, the mechanisms can add users from the queue to join a multiplayer game session in response to determining that the second user has initiated and/or wants to initiate a new game session. In continuing this example, the mechanisms can then cause a multiplayer game session with the second user and the users added from the queue to begin.

In some embodiments, the mechanisms can cause game content (e.g., video content corresponding to interactions between users participating in the multiplayer game session, and/or any other suitable game content) to be presented on each user device of users participating in the multiplayer game session. For example, in some embodiments, the mechanisms can cause game content to be presented in a video window of live-streamed video content on the page associated with the video account of the second user.

In some embodiments, the mechanisms can remove the users participating in the multiplayer game session from the multiplayer game session in response to determining that a game corresponding to the multiplayer game session has ended. Additionally or alternatively, in some embodiments, the mechanisms can then initiate a new game session by adding users from the queue. Additionally or alternatively, in some embodiments, the mechanisms can receive a request to initiate a subsequent multiplayer game session that includes the first user, the second user, and/or any other players that were added from the queue in the previous multiplayer game session.

These are other features for coordinating multiplayer game sessions are described further below in connection with FIGS. 1A-4.

Figure 1A:
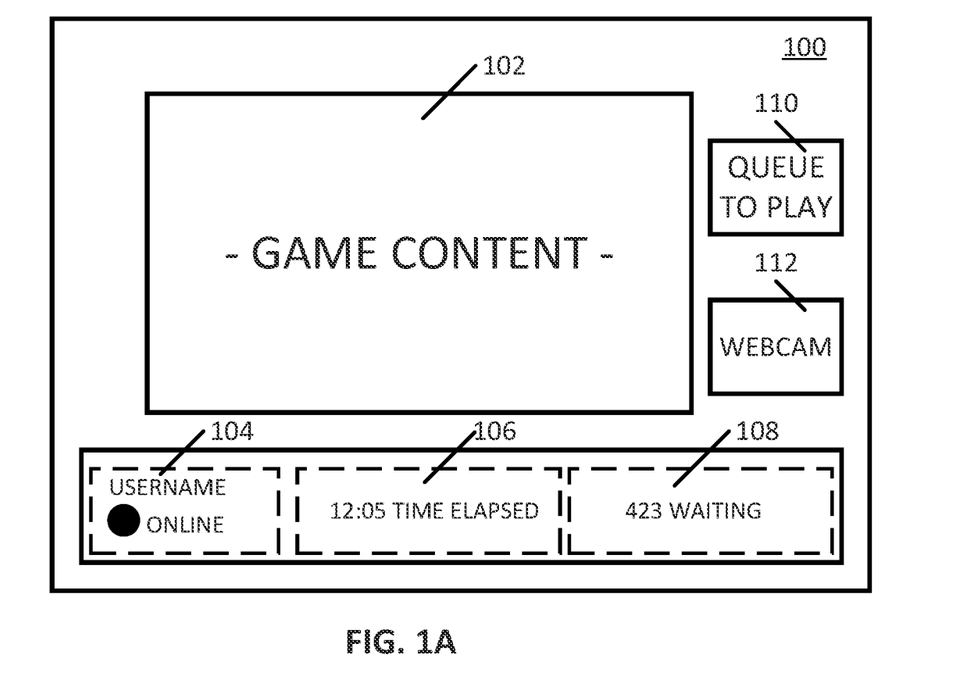
FIGS. 1A-1D show illustrative examples of user interfaces for joining and participating in a multiplayer game session in accordance with some embodiments of the disclosed subject matter.

Turning to FIG. 1A, an illustrative example 100 of a user interface for adding users to a queue to participate in a multiplayer game session is shown in accordance with some embodiments of the disclosed subject matter. In some embodiments, user interface 100 can be presented on a first user device of a first user who is viewing content associated with a second user. For example, in some embodiments, the content associated with the second user can include a live stream of the second user playing a game, pre-recorded video content of the second user playing a game, a home page of a channel of content created by the second user, and/or any other suitable type of content. In a more particular example, user interface 100 can include a page of video content associated with a video account of the second user, where the page of video content can include video content items for playback and can include a video window that contains live-streamed content of the second user playing a particular game in a multiplayer game session.

It should be noted that user interface 100 can be presented in connection with any suitable application, website, or service, such as in connection with an application or website associated with a video sharing service, an application associated with a gaming system, and/or any other suitable type of application or website.

As illustrated, user interface 100 can include game content 102, content creator information 104, game session information 106, queue information 108, a selectable input element 110 to join a queue, and a selectable input element 112 to enable a webcam.

In some embodiments, game content 102 can include any suitable type of media content associated with a game (e.g., a video game, and/or any other suitable type of game). For example, in some embodiments, game content 102 can include live-streamed video content of a user playing a video game, pre-recorded video content of a user playing a video game, and/or any other suitable content. In some embodiments, the user playing the video game can be any suitable user, such as a user with a content channel on a video sharing service, and/or any other suitable user. Note that, in some embodiments, the user playing the video game can be referred to herein as a content creator.

In some embodiments, content creator information 104 can indicate any suitable information about a user associated with creation of game content 102. For example, as shown in FIG. 1A, content creator information 104 can include a username associated with the user and/or an indication of whether the user is currently online. As another example, in some embodiments, content creator information 104 can include any other suitable information, such as an image representing the user (e.g., an avatar, a photo of the user, and/or any other suitable image), a name of a content channel created by the user, and/or any other suitable information. In yet another example, game content 102 can be configured to present pre-recorded video content of a content creator in response to determining that the content creator is not currently online.

In some embodiments, game session information 106 can indicate any suitable information related to a current game session associated with game content 102. For example, in some embodiments, as shown in FIG. 1A, game session information 106 can indicate a duration of time elapsed since the multiplayer game session began. As another example, in some embodiments, game session information 106 can indicate a number of players in the multiplayer game session, and/or any other suitable information.

In some embodiments, queue information 108 can indicate a number of users currently in a queue to join the multiplayer game session. For example, as shown in FIG. 1A, queue information 108 indicates that 423 players are in the queue of players to join a multiplayer game session with the content creator. In another example, queue information 108 can include queue state information that indicates a position in the queue for the user to participate in a multiplayer game session with the content creator (e.g., position #10). In yet another example, queue information 108 can include queue state information that indicates a number of game sessions prior to a user being invited to join a subsequent multiplayer game session. In a further example, queue information 108 can include options for moving up in the queue to join a multiplayer game session, such as an option to sponsor the content creator, an option to provide feedback on a current multiplayer game session, etc.

In some embodiments, selectable input element 110 to join a queue of players can be any suitable type of selectable input element (e.g., a "queue to play" push button, a "join queue" button, and/or any other suitable type of selectable input element) that, when selected, causes a user associated with a user device on which selectable input element 110 was selected to be added to a queue of users waiting to join a multiplayer game session with the user associated with content creator information 104. For example, in response to selecting selectable input element 110, a queue can be presented in user interface 100, where a user account or username associated with a user that selected selectable input element 110 can be added to the queue. In another example, in response to selecting selectable input element 110, a content creator can receive a notification that a user account or username associated with a user that selected selectable input element 110 has been added to the queue.

In some embodiments, selectable input element 112 to enable a webcam can be any suitable type of selectable input element (e.g., a push button, and/or any other suitable type of selectable input element) that, when selected, turns on or otherwise enables a webcam associated with a user device presenting user interface 100. In response to selecting selectable input element 112, image data from a webcam or any other suitable camera device associated with a user device can be received. In continuing this example, game content that includes video content of the gameplay between the user and the content creator in a multiplayer game session can be combined with image data from a webcam (e.g., a webcam of the user and/or a webcam of the content creator) and presented on a video content page (e.g., live-streamed content on a watch page).

Figure 1B:
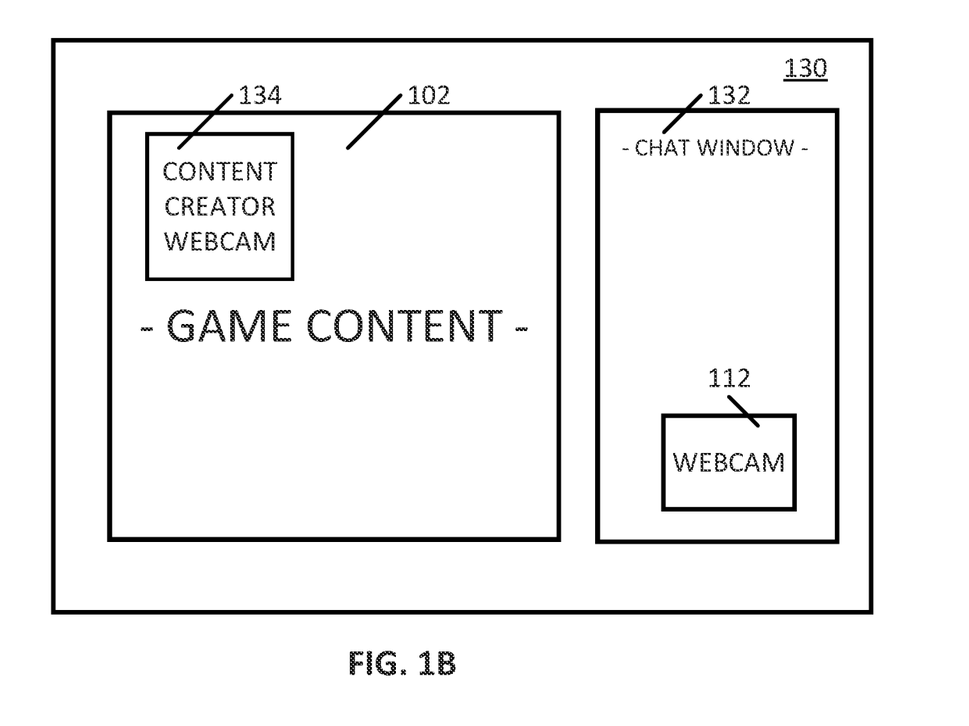

Turning to FIG. 1B, an illustrative example 130 of a user interface that can be presented on a user device of a user who is participating in a multiplayer game session is shown in accordance with some embodiments of the disclosed subject matter. As illustrated, in some embodiments, user interface 130 can include game content 102 and a chat interface 132.

As described above, game content 102 can include any suitable video content associated with a game in which a user of user interface 130 is participating. In some embodiments, a video of a content creator associated with creation of the multiplayer game session corresponding to game content 102 can be included, for example, as content creator webcam 134, as shown in user interface 130. In some embodiments, content creator webcam 134 can show live video content of the content creator participating in the multiplayer game session corresponding to game content 102. In some such embodiments, the live video content can be recorded from any suitable device, such as a webcam or other video camera associated with a user device of the content creator. In some embodiments, a video of a user participating in the multiplayer game session can be included within game content 102. It should be noted that, in some embodiments, the image data from content creator webcam 134, the image data from a user webcam, and the game content that includes the multiplayer game session including the user and the content creator can be combined into a stream that is presented on user interface 100 shown in FIG. 1A.

In some embodiments, chat interface 132 can be any suitable type of messaging interface for participants in a multiplayer game session and/or viewers of a multiplayer game session to receive and transmit messages. For example, in some embodiments, chat interface 132 can include a message entry area (not shown) in which a user of user interface 130 can enter any suitable text, icons, images, animations, hyperlinks, and/or any other suitable content that are to be presented within chat interface 132 and presented on user devices of other users participating in and/or viewing a multiplayer game session. As another example, in some embodiments, chat interface 132 can include a message area in which received messages from multiple users are presented. As yet another example, in some embodiments, chat interface 132 can include options for interacting with the players in the current multiplayer game session (e.g., vote to select a character for a player, select which players can continue to a subsequent multiplayer game session, vote which player should be inhibited from future multiplayer game sessions for being an abusive player, etc.).

Note that, in some embodiments, chat interface 132 can include selectable input element 112 to enable a webcam. Additionally or alternatively, in some embodiments, selectable input element 112 can be located in any other suitable location within user interface 130. Alternatively, in some embodiments, selectable input element 112 can be omitted. In some embodiments, selection of selectable input element 112 can cause a webcam associated with the user device presenting user interface 130 to be enabled. In some such embodiments, video content recorded from the webcam can then be transmitted to and/or presented on any user device of other users participating in the multiplayer game session associated with game content 102. In some embodiments, presentation of the video content can be presented in any suitable time and in any suitable manner. For example, in some embodiments, presentation of the video content recorded from the webcam can be presented in response to determining that a user of user interface 134 is currently participating in game content 102 (e.g., currently interacting with another participant in game content 102, currently transmitting a message within message interface 132, and/or participating in any other suitable manner).

Figure 1C:
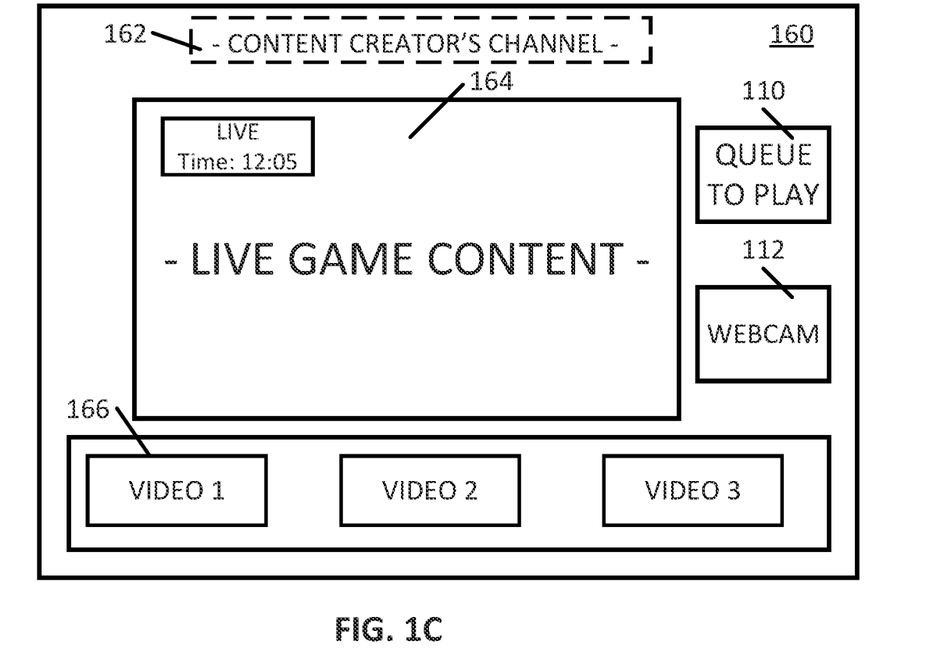

Turning to FIG. 1C, an illustrative example 160 of a user interface for presenting a selectable input element to join a multiplayer game session in connection with a page associated with channel content of a particular content creator is shown in accordance with some embodiments of the disclosed subject matter. As illustrated, user interface 160 can include a title 162, live-streamed game content 164, and available videos for playback 166. In some embodiments, user interface 160 can be associated with any suitable entity, such a video sharing service that hosts the channel of content of the content creator.

In some embodiments, title 162 can be any suitable title indicating content associated with user interface 160. For example, as shown in FIG. 1C, title 162 can indicate that user interface 160 is associated with a page of content corresponding to a channel of media content created by a particular content creator. As a more particular example, in some embodiments, the content creator can be a user who live-streams video content associated with participation in a particular game. As another more particular example, the channel of media content can include video content (e.g., live-streamed video content, pre-recorded video content, and/or any other suitable video content) associated with the content creator participating in different game sessions.

In some embodiments, live-streamed game content 164 can be any suitable live-streamed video content of a content creator live-streaming their participation in a multiplayer game session. In some embodiments, user interface 160 can include any other suitable information about the live-streamed video content, such as a duration of time elapsed since the live stream began (as shown in FIG. 1C), a number of game sessions that the content creator has participated in, a number of remaining game sessions that the content creator will participate in, a number of players currently participating in a multiplayer game session, etc.

In some embodiments, available videos 166 can indicate other video content created by the content creator. For example, in some embodiments, the other video content can include pre-recorded video content created by the content creator, previously live-streamed video content, and/or any other suitable video content. In another example, available videos 166 that have been provided by the content creator can be unrelated to a game or a multiplayer game session. In some embodiments, each video content item included in available videos 166 can be associated with any suitable information about the video content item, such as a thumbnail image associated with the video content item, a date the video content item was created, a title of the video content item, a number of views of the video content item, and/or any other suitable information.

Figure 1D:
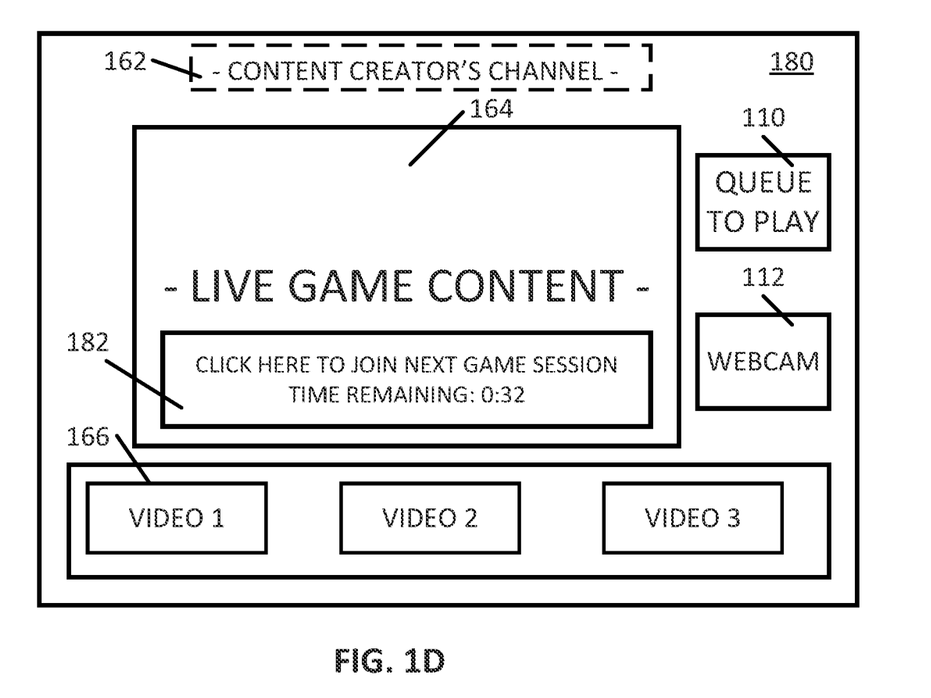

Turning to FIG. 1D, an illustrative example 180 of a user interface for presenting a notification to join a multiplayer game session is shown in accordance with some embodiments of the disclosed subject matter. As illustrated, user interface 180 can include a notification 182.

In some embodiments, notification 182 can be any suitable notification for notifying a user that the user has reached a position within a queue such that the user can join a multiplayer game session (e.g., where the top five users in the queue are selected for participating in a multiplayer game session). In some embodiments, selection of notification 182 can cause the user to be included in the multiplayer game session, as described below in more detail in connection with 214 and 216 of FIG. 2. In some embodiments, notification 182 can include any suitable information, such as a duration of time remaining until the invitation to participate in the multiplayer game session expires or the number of times that the user has received an invitation to participate in the multiplayer game session with the content creator. Note that, although notification 182 is shown in FIG. 1D as being presented in connection with a user interface corresponding to a channel of media content created by a content creator (as shown in and described above in connection with FIG. 1C), this is merely illustrative and notification 182 can be presented in any suitable manner. For example, in some embodiments, notification 182 can be presented in connection with any other suitable user interface, such as user interface 100 of FIG. 1A. As another example, in some embodiments, notification 182 can be presented as a push notification on a user device of the user who has reached a particular position in the queue such that the user can join a multiplayer game session.

Figure 2:
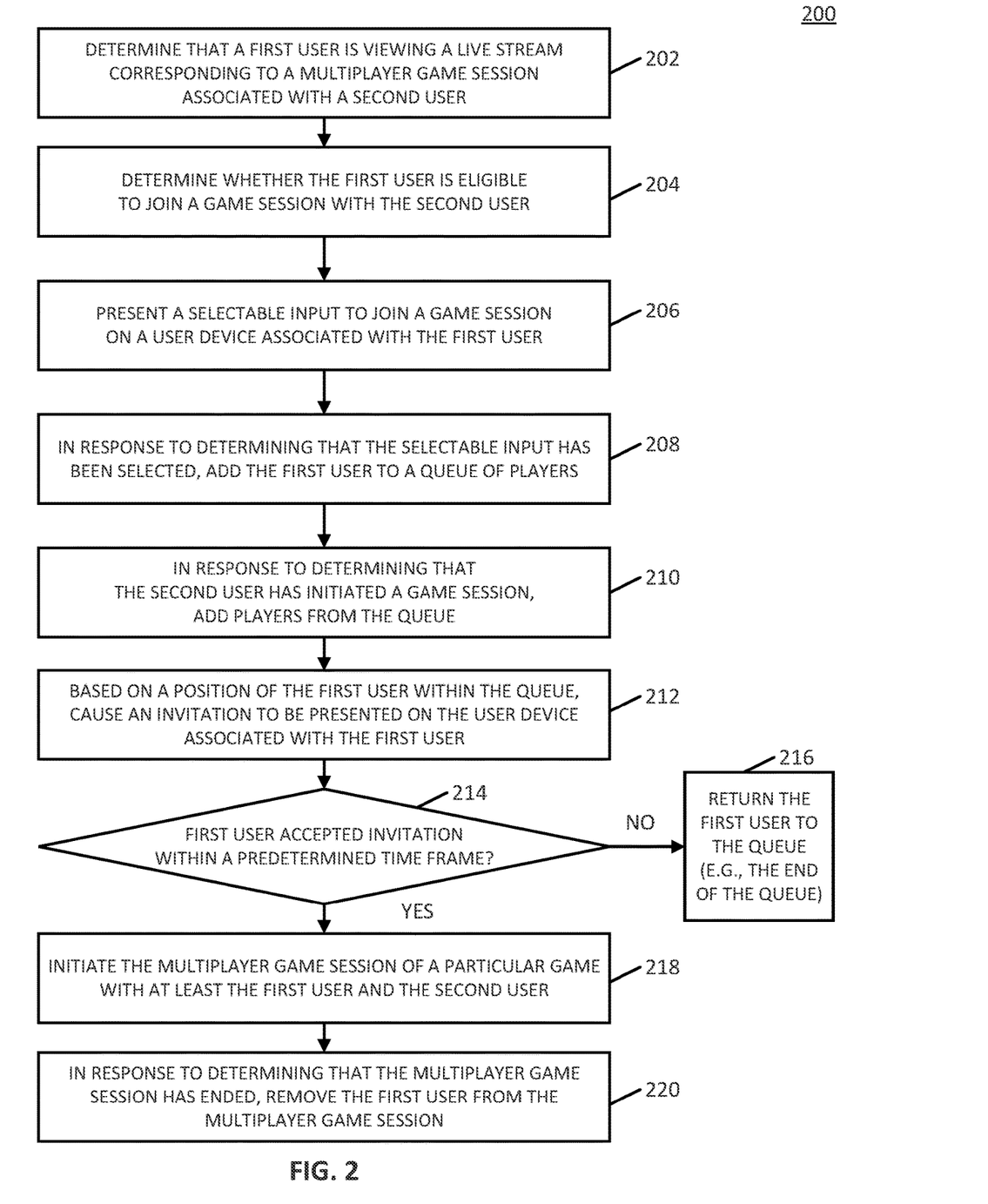
FIG. 2 shows an illustrative example of a process for joining and participating in a multiplayer game session in accordance with some embodiments of the disclosed subject matter.

Turning to FIG. 2, an illustrative example 200 of a process for coordinating a multiplayer game session is shown in accordance with some embodiments of the disclosed subject matter. In some embodiments, blocks of process 200 can be executed by any suitable device, such as a server associated with a video sharing service, a server associated with a game service, and/or any other suitable device.

Process 200 can begin at 202 by determining that a first user is viewing content related to a multiplayer game session associated with a second user. In some embodiments, the content related to a multiplayer game session can include any suitable type of content, such as live-streamed video content of the second user playing a game, pre-recorded video content of the second user playing a game, a home page of a channel created by the second user for sharing video content of the second user playing games, and/or any other suitable type of content. For example, as shown in FIG. 1A, a user interface can be presented in which the first user is viewing content associated with the second user (e.g., video content uploaded by a content creator). In another example, as shown in FIG. 1C, a user interface can be presented in which the first user is viewing channel content on a page that includes video channels, video playlists, and other media content items that have been uploaded by a content creator.

It should be noted that the second user can be any suitable user, such as a content creator associated with a particular content channel on a video sharing service (e.g., a channel related to a particular game, a channel related to playing games, and/or any other suitable type of channel of content).

In some embodiments, process 200 can determine that the first user is viewing the content related to the multiplayer game session based on any suitable information, such as an identifier indicating content currently being viewed by the first user, and/or based on any other suitable information.

At 204, process 200 can determine whether the first user is eligible to join a new multiplayer game session associated with the second user. For example, as described in connection with the one or more criteria below, process 200 can determine player eligibility information associated with the first user, compare the player eligibility information associated with the first user with the one or more criteria for joining the multiplayer game session, and cause options, such as a selectable input element to be placed in a queue for joining a multiplayer game session with the second user, based on the comparison.

In some embodiments, process 200 can determine whether the first user is eligible to join the new game session based on a determination of whether the first user satisfies any suitable criteria. For example, in some embodiments, the criteria can include whether the first user has a user account associated with a particular game service or game system. As a more particular example, in an instance where the criteria include whether the first user has a user account associated with a particular game service or game system, and where process 200 determines that the first user does not have an existing user account associated with the particular game service or game system, process 200 can present a user interface for allowing the first user to create a user account associated with the game service or game system. As another more particular example, in an instance where the criteria include whether the first user has associated a video account of a video sharing service or content hosting service and a gaming account of a gaming service, process 200 can present a user interface that prompts the first user to create a video account, create a gaming account, and/or link the video account with the gaming account.

As another example, in some embodiments, the criteria can include whether the first user has interacted with the second user and/or with content created by the second user. As a more particular example, in some embodiments, the criteria can include whether the first user has subscribed to a channel of content created by the second user and/or sponsored (e.g., provided monetary support to) the second user or content created by the second user. As another more particular example, in some embodiments, the criteria can include whether the first user has endorsed or commented on content created by the second user. Note that, in some embodiments, criteria relating to interactions by the first user with content created by the second user can be specified by the second user and/or by a game system associated with the multiplayer game session. For example, in some embodiments, the second user can specify that to join a multiplayer game session with the second user, the first user must sponsor the second user. As yet another more particular example, in some embodiments, the criteria can include that the first user has not been previously blocked from viewing content associated with the second user (e.g., blocked on a video sharing service in which the second user has a page, blocked from a game service in which the second user has a page, etc.) and/or blocked from interacting with the second user.

As yet another example, in some embodiments, the criteria can include whether the first user has any particular entitlements related to a particular game to be played in the multiplayer game session. As a more particular example, in some embodiments, the criteria can include whether the first user has purchased or rented the game. Note that, in instances where the criteria include whether the first user has particular entitlements related to a particular game, and in an instance where process 200 determines that the first user does not have the particular entitlements related to the particular game, process 200 can present a user interface that allows the first user to purchase the game, rent the game, and/or satisfy the criteria required to the entitlements in any particular manner. In another more particular example, process 200 can determine whether the first user has particular entitlements to join a multiplayer game session of a particular game by accessing a game account associated with the first user and determining whether the particular game has been in instances where the criteria include whether the first user has particular entitlements related to a particular game has been associated with the game account.

As still another example, in some embodiments, the criteria can include whether an age of the first user is greater than a predetermined threshold. In some embodiments, the age can be any suitable age (e.g., that the first user is older than 13 years old, older than 18 years old, and/or any other suitable age). In some embodiments, process 200 can determine whether the first user satisfies age-related criteria based on any suitable information, such as information indicated by the first user in connection with a user account of the first user (e.g., a user account associated with a game service or game system, a user account associated with a video sharing service, a user account associated with an umbrella service that includes a game service and/or a video sharing service, and/or any other suitable user account).

As a further example, in some embodiments, the criteria can include whether the first user is associated with a particular location information. In some embodiments, the location information can be particular coordinates, a particular country (e.g., a participating country), a particular distance from the second user (e.g., fifty miles from a location associated with a second user device of the second user).

As another further example, in some embodiments, the criteria can include whether the first user is using a particular application to view the video content of the second user. For example, process 200 can determine whether a first user device of the first user is executing a particular web browser application to access a page of video content associated with the second user. In another example, process 200 can determine whether a first user device of the first user is executing a particular web browser application to access a page of video content associated with the second user and can determine that a gaming application has been installed on the first user device.

It should be noted that process 200 can determine whether the first user is eligible to join a new multiplayer game session associated with the second user at any suitable time. For example, process 200 can determine whether the first user is eligible to join a new multiplayer game session associated with the second user in response to accessing the page of video content associated with the second user. In another example, process 200 can determine whether the first user is eligible to join a new multiplayer game session associated with the second user in response to receiving a selection of the selectable input element described herein. In yet another example, process 200 can determine whether the first user is eligible to join a new multiplayer game session associated with the second user in response to authenticating a video account with a video sharing service or content hosting service.

At 206, in response to determining that the first user is eligible to join a multiplayer game session with the second user (e.g., in response to determining that the first user has satisfied any suitable criteria, as described above in connection with 204), process 200 can present a selectable input element to join a multiplayer game session on a user device associated with the first user. In some embodiments, the selectable input element can be presented in any suitable user interface, such as a user interface in which the first user is viewing content associated with the second user, a user interface in which the first user is viewing a live stream of the second user playing a game, and/or any other suitable user interface. An example of a user interface in which a selectable input element to join a multiplayer game session from a page in which a user is viewing content created by the second user is shown in and described above in connection with FIG. 1A. An example of a user interface in which a selectable input element to join a multiplayer game session from a page in which a user is viewing live-streamed content created by the second user is shown in and described above in connection with FIG. 1B.

It should be noted that, in some embodiments, process 200 can activate a selectable input element on a user interface (e.g., within a video window that is presenting live-streamed content of a current multiplayer game session) in response to determining that the first user has satisfied one or more criteria. Alternatively, in response to determining that the first user has not satisfied one or more criteria, process 200 can present the selectable input element in the user interface, but may inhibit the selectable input element from being activated (e.g., where the element is not selectable, where the element is visually distinguished from an active state, etc.).

It should also be noted that, in some embodiments, process 200 can activate a selectable input element on a user interface being presented on a first user device of the first user in response to settings received from the second user. For example, the second user can activate a selectable input element (e.g., a "queue to play" button) and provide one or more criteria for determining whether a first user or other joining users is eligible to participate in a multiplayer game session with the second user, where the selectable input element is presented in connection with one or more content items associated with the second user (e.g., a home page corresponding to an account of the second user, one or more video content items uploaded by the second user, etc.).

It should further be noted that, in some embodiments, the criteria or player eligibility information for activating the selectable input element can be set by any suitable entity (e.g., an entity associated with the game may require that players in a multiplayer game session involving the game be over the age of 18 and within the United States).

At 208, in response to determining that the first user has selected the selectable input element to join a multiplayer game session with the second user, process 200 can add the first user to a queue of players for participating in a multiplayer game session with the second user. In some embodiments, any suitable other users can be included in the queue (e.g., other users who have selected selectable input elements to join a multiplayer game session with the second user, users that are currently involved in a multiplayer game session and have indicated that they wish to play in a subsequent multiplayer game session with the second user, and/or any other suitable users). It should be noted that there can be any suitable number (e.g., ten, fifty, one hundred, and/or any other suitable number) of users in the queue of players. Note that, in some embodiments, any suitable information associated with the queue of players waiting to join a multiplayer game session associated with the second user can be stored on any suitable device. For example, in some embodiments, a server associated with a game service or a game system (and/or any other suitable server) can store information, such as usernames associated with each user in the queue, a position within the queue of each user in the queue, a time each user joined the queue, and/or any other suitable information.

It should be noted that, in some embodiments, in response to determining that the second user is no longer available to participate in a multiplayer game session (e.g., the second user is offline or otherwise not authenticated with a gaming service or a content hosting service) and in response to determining that the second user has returned within a particular period of time (e.g., the second user is available to participate in multiplayer game sessions and five minutes has elapsed), process 200 can recover the queue and, to the extent the users remain available, replace the users within the queue at the previously known position.

In some embodiments, process 200 can allow the second user to modify the queue of players. For example, in some embodiments, the second user can provide an indication to remove a particular player from the queue of players (e.g., block a player from joining a multiplayer game session). In another example, in some embodiments, the second user can activate a criterion (e.g., a sponsorship criterion) that, upon satisfying the criterion, can advance particular players within the queue of players. In yet another example, in some embodiments, the second user can select an option to initiate a subsequent multiplayer game session with the same users in the current multiplayer game session, thereby not accepting additional players from the queue of players.

Note that, in some embodiments, the selectable input element described above in connection with 206 can be updated in response to the first user being added to the queue. For example, in some embodiments, the selectable input element can be modified to a selectable input element that, upon selection, causes the first user to leave the queue. As another example, in some embodiments, the selectable input element can be modified to indicate a current position of the first user within the queue (e.g., position #10, three more multiplayer game sessions until the first user can join a multiplayer game session, etc.). Note that, in some such embodiments, the selectable input element can be modified over time as the first user changes position within the queue (e.g., as the first user moves up in the queue).

Additionally or alternatively, the selectable input element can be deactivated or otherwise rendered to be not selectable on a first user device associated with the first user to inhibit the first user from entering the queue at multiple times.

At 210, in response to determining that the second user has initiated a new multiplayer game session, process 200 can begin adding users from the queue to the new multiplayer game session. In some embodiments, process 200 can add users from the queue to the new multiplayer game session in any suitable manner. For example, in some embodiments, process 200 can add users from the head of the queue to the multiplayer game session. Note that, in some embodiments, any suitable number (e.g., five, ten, twenty, and/or any other suitable number) of users can be added to the new multiplayer game session from the queue. In some embodiments, a number of users added to the multiplayer game session from the queue can be specified by any suitable entity, such as the second user, a manufacturer of the game associated with the multiplayer game session, a game system or game service associated with the multiplayer game session, and/or any other suitable entity. More detailed techniques for adding a user from the queue to the multiplayer game session are described below in connection with blocks 212-216.

At 212, in response to determining that the first user has moved to the head of the queue, process 200 can cause an invitation to join a multiplayer game session on a user device associated with the first user. In some embodiments, process 200 can cause the invitation to join the multiplayer game session to be presented in any suitable manner. For example, in some embodiments, the invitation can be a push notification presented on the user device. As another example, in some embodiments, the invitation can be a pop-up message presented within a window or application in which the user selected the selectable input element as described above in connection with 206. As yet another example, in some embodiments, the invitation can be a notification within a browser window open on the user device (e.g., a browser window in which the user is viewing the live-streamed content as described above in connection with 202). An example of a notification presented on a user device associated with the first user is shown in and described above in connection with FIG. 1D.

At 214, process 200 can determine whether the first user has accepted the invitation to join the multiplayer game session within a predetermined time range. In some embodiments, the predetermined time range can be any suitable time range (e.g., sixty seconds, two minutes, and/or any other suitable time range). In some embodiments, process 200 can determine whether the first user has accepted the invitation based on any suitable information, such as whether the invitation has been selected on the user device.

If, at 214, process 200 determines that the first user has not accepted the invitation to join the multiplayer game session within the predetermined time range ("no" at 214), process 200 can return the first user back to the queue at 216. For example, in an instance where the first user was first in the queue at 212, and where there are 200 users in the queue, process 200 can move the first user to the 201$^{st}$ position in the queue or the end of the queue. Note that, in some embodiments, process 200 can loop back to 212 and can wait until the first user is once again at the head of the queue. In another example, in an instance where the first user was first in the queue at 212, and where there are 200 users in the queue, process 200 can return the first user to the top position of the queue for the next multiplayer game session (e.g., until process 200 has determined that the first user has not accepted a predetermined number of invitations to join the multiplayer game session).

Additionally, note that, in some embodiments, process 200 can remove the first user from the queue in response to determining that the user has not accepted a presented invitation a predetermined number of times (e.g., three time, five times, and/or any other suitable number). That is, in some embodiments, process 200 can limit a number of times that the first user is moved to the end of the queue or any other position in the queue at block 216 in response to determining that the first user has not accepted the invitation to join the multiplayer game session.

If, at 214, process 200 determines that the first user has accepted the invitation to join the multiplayer game session within the predetermined time range ("yes" at 214), process 200 can initiate the multiplayer game session with at least the first user and the second user at 218. Process 200 can begin the multiplayer game session in any suitable manner. For example, in some embodiments, process 200 can begin the multiplayer game session in response to determining that the second user has initiated a new game (e.g., based on determining that the second user has selected a selectable input element to begin a new game, and/or based on any other suitable information). As another example, in some embodiments, process 200 can cause game content associated with the multiplayer game session to be presented on user devices of all users participating in the multiplayer game session. An example of a user interface that includes game content that can be presented on user devices of users participating in the multiplayer game session is shown in and described above in connection with FIG. 1B. As a more particular example, in some embodiments, the game content can include live video content showing interactions of users participating in the multiplayer game session. As another more particular example, in some embodiments, the game content can be presented within a user interface that includes a messaging interface that can receive and present messages from users participating in the multiplayer game session, as shown in and described above in connection with FIG. 1B.

Note that, in connection with initiating the multiplayer game session, process 200 can cause a user device associated with the first user to change and/or launch a new application in connection with the initiated game session. For example, in an instance where the selectable input element to join a multiplayer game session was presented in an application or a user interface associated with a video sharing service (e.g., a video sharing service hosting content associated with the second user viewed by the first user, as described above in connection with 202), process 200 can cause the multiplayer game session to begin on the user device associated with the first user in connection with a window or an application associated with a game service or a game system. As a more particular example, in some embodiments, in response to the new multiplayer game session beginning, process 200 can cause an application associated with a game system or a game service to automatically be opened on the user device associated with the first user. In some such embodiments, process 200 can cause a window or an application associated with a video sharing service to execute in a background of the user device associated with the first user.

Note that, in some embodiments, process 200 can remove all users from the queue in response to adding the users to the multiplayer game session.

In some embodiments, as mentioned above in connection with FIGS. 1A-1D, a video content item can be generated from the multiplayer game session. For example, a video content item can include a portion of the multiplayer game session and can be uploaded to a page of content items associated with the second user. In another example, the video content item or a link to the video content item can be transmitted to the first user and/or the second user in response to determining that the multiplayer game session has ended. In yet another example, the video content item can include a composite stream of game content from the multiplayer game session, image or video content from one or more activated camera devices corresponding to the players participating in the multiplayer game session, chat information from a messaging interface that was presented during the multiplayer game session, etc.

At 220, process 200 can remove the first user (and/or any other users that participated in the multiplayer game session) in response to determining that the multiplayer game session has ended. In some embodiments, process 200 can then begin a new game session with a new group of users from the queue. Alternatively, in some embodiments, process 200 can begin a new game session with the group of users that includes the first user, for example, in response to receiving an indication from the second user that the second user wants to play another game with some or all of the users from the previous multiplayer game session. Alternatively, in some embodiments, process 200 can begin a new multiplayer game session that includes the first user, for example, in response to determining a game type in which a player that is deemed the winner continues to the next multiplayer game session.

In some embodiments, in an instance where the multiplayer game session was played in a window or an application associated with a game system and/or a game service, process 200 can re-open and/or move a window or an application associated with a video sharing service from which the selectable input element to join the multiplayer game session was selected in connection with 208 to a foreground process executing on the user device associated with the first user.

Figure 3:
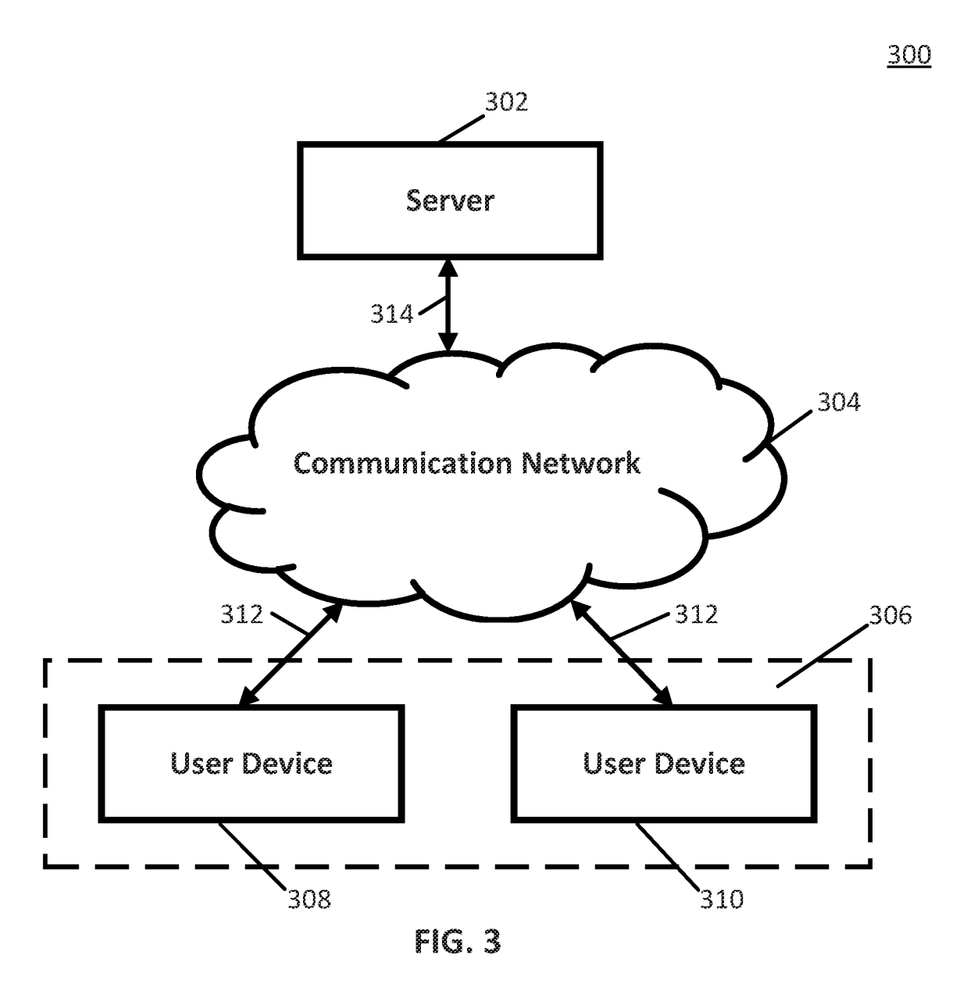
FIG. 3 shows a schematic diagram of an illustrative system suitable for implementation of mechanisms described herein for coordinating multiplayer game sessions in accordance with some embodiments of the disclosed subject matter.

Turning to FIG. 3, an example 300 of hardware for joining and participating in a multiplayer game session that can be used in accordance with some embodiments of the disclosed subject matter is shown. As illustrated, hardware 300 can include a server 302, a communication network 304, and/or one or more user devices 306, such as user devices 308 and 310.

Server 302 can be any suitable server(s) for storing information, data, and/or media content, games, and/or any other suitable type of content. For example, in some embodiments, server 302 can store media content items, which can be transmitted to user devices 306 for presentation. In some such embodiments, the media content items can include any suitable types of media content, such as videos, movies, television programs, live-streamed content, audio content (e.g., music, audiobooks, radio programs, and/or any other suitable audio content), video game content, and/or any other suitable type of media content. Additionally or alternatively, in some embodiments, server 302 can coordinate a multiplayer game session. For example, as described in more detail above in connection with FIGS. 1A, 1B, and 2, server 302 can create and/or manage a queue of users to play in a multiplayer game session with a content creator, and/or perform any other suitable functions.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for presenting media content, game content, and/or any other suitable type of content. For example, in some embodiments, user devices 306 can include a television, speakers, a mobile phone, a tablet computer, a media player, a desktop computer, a vehicle entertainment system, a wearable computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Server 302 and user devices 306 can be implemented using any suitable hardware in some embodiments. For example, in some embodiments, devices 302 and 306 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
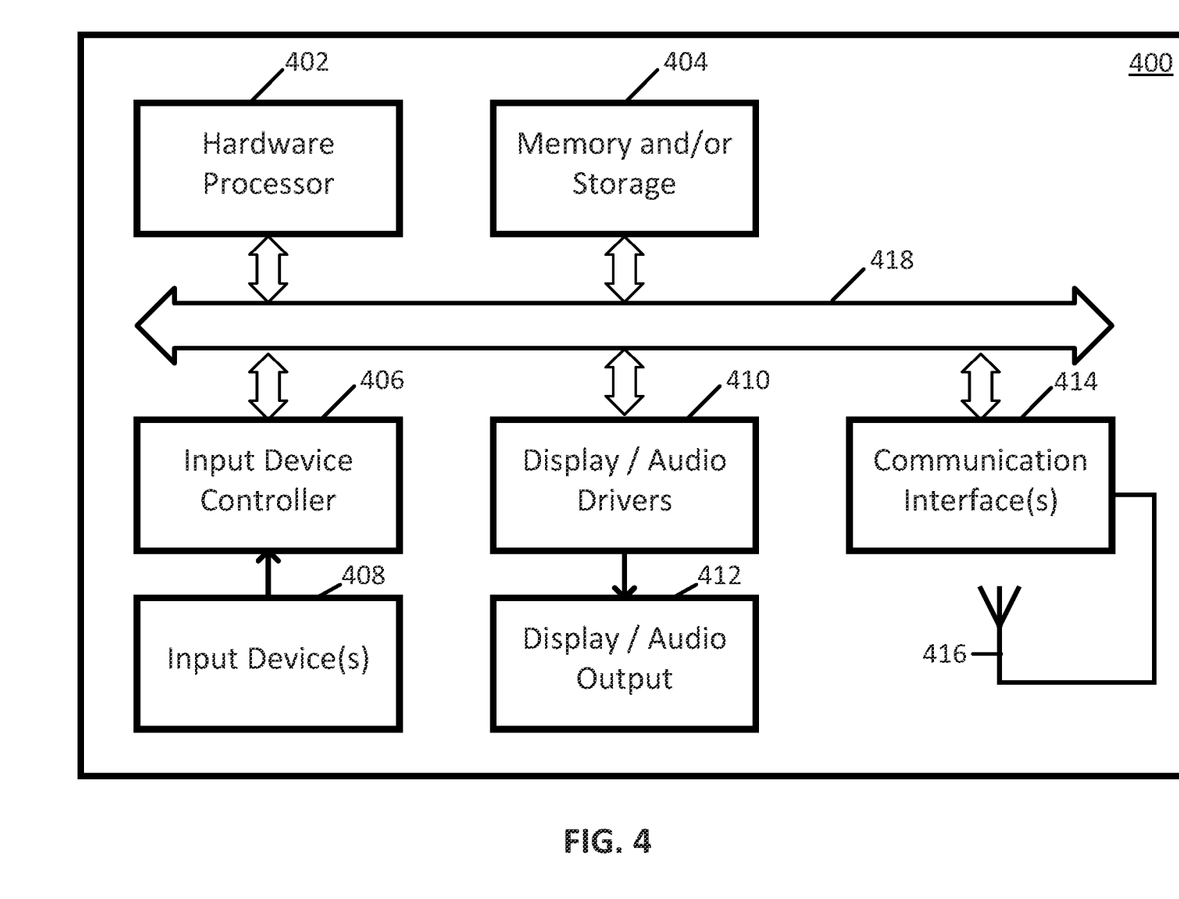
FIG. 4 shows a detailed example of hardware that can be used in a server and/or a user device of FIG. 3 in accordance with some embodiments of the disclosed subject matter.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage of a server, such as server 302. For example, in some embodiments, the server program can cause hardware processor 402 to add a user device 306 to a queue of users or user devices waiting to join a multiplayer game session, determining whether a user of user device 306 has accepted an invitation to join a multiplayer game session within a predetermined duration of time, coordinating a multiplayer game session, and/or perform any other suitable functions. In some embodiments, hardware processor 402 can be controlled by a computer program stored in memory and/or storage 404 of user device 306. For example, the computer program can cause hardware processor 402 to transmit a request to join a queue of users waiting to join a multiplayer game session, transmit an indication that a user of user device 306 has accepted an invitation to join a multiplayer game session, allow a user of user device 306 to participate in a multiplayer game session, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the process of FIG. 2 can be executed or performed in any order or sequence not limited to the order and sequence shown in and described in connection with the figures. Also, some of the above blocks of FIG. 2 can be executed or performed substantially simultaneously where appropriate or in parallel to reduce latency and processing times. Additionally or alternatively, some of the above described blocks of the process of FIG. 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for coordinating multiplayer game sessions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for coordinating multiplayer game sessions, the method comprising:
   determining that a first user associated with a first user device is viewing game content created by a second user associated with a second user device; and
   causing a selectable input element to join a queue of players to participate in a multiplayer game session with the second user to be presented on the first user device based on the first user satisfying criteria for joining a multiplayer game session with the second user, wherein receiving a selection of the selectable input element:
      causes the first user to be added to a position in the queue of players;
      causes an invitation to join the multiplayer game session to be presented on the first user device in response to determining that the first user can participate in the multiplayer games session based on the position within the queue of players; and
      causing the first user to be added to the multiplayer game session that includes at least the first user and the second user in response to determining that the invitation to join the multiplayer game session has been accepted on the first user device.

2. The method of claim 1, wherein determining that the invitation to join the multiplayer game session has been accepted on the first user device further comprises:
   determining whether the invitation has been accepted within a predetermined time range; and
   in response to determining that the invitation has not been accepted within the predetermined time range, returning the first user to a position within the queue of players to participate in an upcoming multiplayer game session.

3. The method of claim 2, further comprising removing the first user from the queue of players in response to determining that the first user has been moved to an end position within the queue of players more than a predetermined number of times.

4. The method of claim 1, wherein the criteria to join the multiplayer game session with the second user includes an indication that the first user has subscribed to the second user.

5. The method of claim 1, wherein the criteria to join the multiplayer game session with the second user includes an indication that the first user has purchased a game associated with the multiplayer game session and wherein the method further comprises presenting an option to purchase the game associated with the multiplayer game session in response to determining that the first user has not purchased the game associated with the multiplayer game session.

6. The method of claim 1, wherein determining that the first user associated with the first user device is viewing the game content created by the second user associated with the second user device further comprises determining that the first user associated with the first user device has accessed a page that presents video channels associated with the second user, wherein one of the video channels on the page is streaming gameplay of the second user in a video window, wherein the selectable input element is presented within the video window, and wherein the multiplayer game session that includes at least the first user and the second user is presented in the video window.

7. The method of claim 6, further comprising:
   in response to determining that the first user associated with the first user device has accessed the page in which the video window is streaming gameplay of the second user, determining player eligibility information associated with the first user and determining queue state information associated with the first user;
   comparing the player eligibility information associated with the first user with the criteria for joining the multiplayer game session with the second user; and
   causing the selectable input element to join the queue of players to participate in the multiplayer game session with the second user to be presented based on the comparison.

8. The method of claim 1, wherein the criteria to join the multiplayer game session includes an indication that the first user has associated a video account associated with a video service that presents the page of video channels with a gaming account associated with the game corresponding to the multiplayer game session.

9. The method of claim 1, further comprising:
   receiving a request from the second user associated with the second user device to activate the multiplayer game session in which the second user is participating, wherein the game content corresponding to the multiplayer game session is streamed to a page; and
   receiving the criteria for joining the multiplayer game session from the second user associated with the second user device, wherein the selectable input element is presented to the first user in response to satisfying the criteria.

10. The method of claim 9, further comprising, in response to receiving the request from the second user associated with the second user device to enable the multiplayer game session in which the second user is participating, determining whether the second user has associated a video account associated with a video service that presents the page of video channels with a gaming account associated with the game corresponding to the multiplayer game session.

11. The method of claim 1, further comprising:
   receiving a request from the second user to present image content from a camera device connected to the second user device; and
   generating a content stream that includes the game content from the multiplayer game session and the image content from the camera device connected to the second user device.

12. The method of claim 11, further comprising transmitting the content stream to the first user device and the second user device.

13. The method of claim 1, further comprising:
   determining that the first user is inhibited from participating in the multiplayer game session with the second user; and
   inhibiting the selectable input element from being presented on the first user device.

14. The method of claim 13, wherein the first user is inhibited from participating in the multiplayer game session in response to receiving an indication from the second user of the second user device.

15. The method of claim 1, further comprising causing an interface that includes the queue of players to be presented to the second user of the second user device, wherein the interface provides selectable options that allow the second user to modify the queue of players.

16. The method of claim 1, further comprising:
   generating a video content item from the game content of the multiplayer game session that included at least the first user and the second user; and causing the video content item to be presented on a page associated with that presents video channels associated with the second user, wherein one of the video channels on the page is streaming gameplay of the second user in a video window, wherein the selectable input element is presented within the video window.

17. The method of claim 1, further comprising receiving a request from the second user to initiate a subsequent game session that includes at least the first user and the second user.

18. The method of claim 1, further comprising removing the first user from the multiplayer game session in response to determining that the multiplayer game session has ended.

19. A system for coordinating multiplayer game sessions, the system comprising:
   a memory; and
   a hardware processor that, when executing computer executable instructions stored in the memory, is configured to:
      determine that a first user associated with a first user device is viewing game content created by a second user associated with a second user device; and
      cause a selectable input element to join a queue of players to participate in a multiplayer game session with the second user to be presented on the first user device based on the first user satisfying criteria for joining a multiplayer game session with the second user, wherein receiving a selection of the selectable input element:
         causes the first user to be added to a position in the queue of players;
         causes an invitation to join the multiplayer game session to be presented on the first user device in response to determining that the first user can participate in the multiplayer games session based on the position within the queue of players; and
         causing the first user to be added to the multiplayer game session that includes at least the first user and the second user in response to determining that the invitation to join the multiplayer game session has been accepted on the first user device.

20. A non-transitory computer-readable medium containing computer executable instructions that, when executed by a processor, cause the processor to perform a method for coordinating multiplayer game sessions, the method comprising:
   determining that a first user associated with a first user device is viewing game content created by a second user associated with a second user device; and
   causing a selectable input element to join a queue of players to participate in a multiplayer game session with the second user to be presented on the first user device based on the first user satisfying criteria for joining a multiplayer game session with the second user, wherein receiving a selection of the selectable input element:
      causes the first user to be added to a position in the queue of players;
      causes an invitation to join the multiplayer game session to be presented on the first user device in response to determining that the first user can participate in the multiplayer games session based on the position within the queue of players; and
      causing the first user to be added to the multiplayer game session that includes at least the first user and the second user in response to determining that the invitation to join the multiplayer game session has been accepted on the first user device.

* * * * *